United States Patent
Aaltonen et al.

(10) Patent No.: US 12,399,005 B2
(45) Date of Patent: Aug. 26, 2025

(54) MEMS GYROCOMPASS

(71) Applicant: Murata Manufacturing Co., Ltd., Nagaokakyo (JP)

(72) Inventors: Lasse Aaltonen, Espoo (FI); Anssi Blomqvist, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 382 days.

(21) Appl. No.: 18/177,158

(22) Filed: Mar. 2, 2023

(65) Prior Publication Data
US 2023/0204358 A1    Jun. 29, 2023

Related U.S. Application Data

(63) Continuation of application No. PCT/IB2021/059924, filed on Oct. 27, 2021.

(30) Foreign Application Priority Data

Oct. 30, 2020    (FI) ..................................... 20206083

(51) Int. Cl.
G01C 19/34    (2006.01)
G01C 25/00    (2006.01)

(52) U.S. Cl.
CPC ............. *G01C 19/34* (2013.01); *G01C 25/00* (2013.01)

(58) Field of Classification Search
CPC .......... G01C 19/34; G01C 19/36; G01C 19/38
USPC ........................................... 33/316, 318, 321
See application file for complete search history.

(56) References Cited

U.S. PATENT DOCUMENTS

| | | | |
|---|---|---|---|
| 7,086,164 B2* | 8/2006 | Satoh | G01C 17/30 33/316 |
| 7,412,775 B1* | 8/2008 | Karnick | G01C 19/38 33/324 |
| 7,671,794 B2* | 3/2010 | Pinto | G01S 19/47 342/357.29 |
| 8,151,475 B2* | 4/2012 | Albo | F41G 3/02 33/324 |

(Continued)

FOREIGN PATENT DOCUMENTS

| | | |
|---|---|---|
| EP | 2026036 A2 | 2/2009 |
| GB | 2385078 A | 8/2003 |

OTHER PUBLICATIONS

International Search Report issued for PCT/IB2021/059924, date of mailing Jan. 21, 2022.

(Continued)

*Primary Examiner* — George B Bennett
(74) *Attorney, Agent, or Firm* — ArentFox Schiff LLP

(57) ABSTRACT

A gyrocompass device is provided for determining a heading relative to a surface of a rotating planetary body. The gyrocompass device includes one or more MEMS gyroscopes that are each fixed in an orientation on a substrate that is parallel to a first plane and that each provide three or more sense axes that lie within the first plane and are each offset from one another by an offset angle. Moreover, a heading determiner receives rotation rates from the three sense axes and determines the heading of the gyrocompass device relative to the surface of the rotating planetary body by fitting a sine or cosine function to the received rotation rates from the one or more MEMS gyroscopes.

20 Claims, 7 Drawing Sheets

(56) References Cited

U.S. PATENT DOCUMENTS

| | | | |
|---|---|---|---|
| 8,782,913 B2* | 7/2014 | Roberfroid | G01C 19/38 |
| | | | 33/324 |
| 9,599,474 B2* | 3/2017 | Bye | G01C 21/185 |
| 9,846,037 B2* | 12/2017 | Aaltonen | G01C 19/5726 |
| 11,796,560 B2* | 10/2023 | Liukku | G01P 15/125 |
| 2006/0196269 A1 | 9/2006 | Jaffe et al. | |
| 2011/0178707 A1 | 7/2011 | Sachs | |
| 2013/0192072 A1 | 8/2013 | Gnepf | |
| 2016/0047675 A1 | 2/2016 | Tanenhaus et al. | |
| 2020/0033131 A1 | 1/2020 | Reid et al. | |
| 2023/0085473 A1* | 3/2023 | Blomqvist | G01C 19/005 |
| | | | 73/504.12 |
| 2024/0174511 A1* | 5/2024 | Fukumitsu | H10D 48/50 |
| 2024/0391759 A1* | 11/2024 | Nurmi | B81B 7/007 |

OTHER PUBLICATIONS

Meyer, A.D. et al.; "milli-HRG Inertial Navigation System"; Journal of the Institute of Navigation, Dec. 31, 2012, pp. 24-29, XP056003741.
Prikhodko, I et al; "What is MEMS Gyrocompassing? Comparative Analysis of Maytagging and Carouseling"; Journal of Microelectromechanical Systems, vol. 22, No. 6, Dec. 2013, pp. 1257-1266.

* cited by examiner

MEMS GYROCOMPASS

CROSS REFERENCE TO RELATED APPLICATIONS

This application is a continuation of PCT Application No. PCT/IB2021/059924, filed Oct. 27, 2021, which claims priority to Finnish Patent Application No. 20206083, filed Oct. 30, 2020, the entire contents of each of which are hereby incorporated by reference in its entirety.

TECHNICAL FIELD

The present invention relates to the field of MEMS (microelectromechanical systems) and, in particular, to the use of MEMS gyroscopes for in a gyrocompass for finding a geographical heading.

BACKGROUND

When determining a geographical heading, the yaw direction, i.e., the angle of orientation parallel to the surface of the Earth, is most commonly found using a magnetic compass. However, both mechanical and electrical compasses have signification drawbacks. The magnetic poles of the earth lie a significant distance away from the true geographic poles (i.e., where the axis of the Earth's rotation meets the surface of the Earth) and, furthermore, the North magnetic pole in particular is wandering with increasing speed. In addition, the geomagnetic field is weak and has been weakening (with increased speed) for its entire measured history. The weak field is therefore practically unusable in many applications where magnetic materials are present, for example, in cars and other vehicles with structural metals and electric currents which produce magnetic fields, and in indoor and urban areas with steel reinforced concrete or other structures and objects containing metals. Furthermore, in applications requiring any sort of precision, compasses need frequent calibration for reliable heading measurement even in good open area outdoor conditions.

Therefore, in applications that require the determining of geographical heading with a high level of accuracy, such as marine navigation, other types of compasses are used, such as gyrocompasses. A conventional gyrocompass is a mechanical gimballed spinning mass that aligns its own rotational axis with the axis of the earth. However, conventional gyrocompasses are large, expensive and relatively unreliable devices requiring regular maintenance.

To overcome the issues of the conventional gyrocompass, high performance angular rate sensors, such as high-performance MEMS gyroscopes, have been used to directly measure the rotation of the Earth with respect to the device heading. However, the static earth rotation rate to be measured is typically at least three orders of magnitude smaller than the angular rates resulting from the dynamic heading changes of the device itself. Therefore, such devices must be essentially stationary during the measurement for heading determination.

The ability to use MEMS gyroscopes for measuring a very low rotation rate is severely limited by the bias error of MEMS gyroscopes, which has historically been orders of magnitude larger than the Earth's rotation rate. Two approaches called "carouselling" and "maytagging" have been developed to attempt to offset or eliminate the bias error in order to improve the performance of MEMS gyroscopes for gyrocompassing. In carouselling, the MEMS gyroscope is rotated around the vertical yaw axis (i.e., the gravity axis) with a constant angular rate, which changes the heading of the gyroscope's sense axis with respect to north. The gyroscope therefore measures a constantly changing component of the Earth's rotation, resulting in sinusoidal waveform from which north can be determined as the direction of the peak amplitude (90°) of the sinusoidal waveform. In this process, the constant rotation of Earth is therefore modulated to an AC-signal, essentially eliminating the need for extreme offset accuracy. However, the higher the noise of the gyroscope, the slower the rotation needs to be in order to be able to average the reading in order to minimize the effect of the noise. This result in very slow rotation, but at the same time the rotation rate needs to be essentially constant for an accurate heading determination. The mechanic systems required to produce such a slow, constant turn are, however, unreliable, bulky, complex and expensive.

In maytagging, the gyroscope is periodically turned by 180° in order to cancel the bias error. However, the turning of the gyroscope slows down the determination of the heading due to the time that needs to be allocated for the rotation and settling of the rate signal.

SUMMARY OF THE INVENTION

Thus, according to a first exemplary aspect, a gyrocompass device is provided for determining a heading relative to a surface of the Earth or other rotating planetary body. In an exemplary aspect, the device includes one or more MEMS gyroscopes that provide at least three sense axes arranged such that the sense axes lie within a first plane and each sense axis is offset from the other sense axes by a known offset angle, and a heading determiner component (e.g., electronic circuitry) that is configured to receive rotation rates from the one or more MEMS gyroscopes and to determine the heading of the device relative to the surface of the Earth or other rotating planetary body based on the rotation rates received from the one or more MEMS gyroscopes and further to fit the amplitude of the sine or cosine function to the received rotation rates and to determine the latitude of the gyrocompass.

Moreover, in an exemplary aspect, the angles of the sense axes of the one or more MEMS gyroscopes may be angled at regular intervals of 360/N, where N is the number of sense axes.

In addition, N may be an even number such that the sense axes of the one or more MEMS gyroscopes are arranged into pairs, wherein the sense axes in each pair are offset by 180 degrees.

In an exemplary aspect, the device may be configured to retrieve values for the bias error of each of the sense axes of the one or more MEMS gyroscopes in a lookup table and to subtract the bias error from the received rotation rates before determining the heading of the device.

In another exemplary aspect, the device may be configured to retrieve values from the lookup table based on the sum of at least two of the received rotation rates, wherein the at least two received rotation rates are received from sense axes arranged at regular intervals around 360 degrees such that the component of the Earth's rotation in the rate signals is cancelled in the sum of the at least two received rotation rates.

In another exemplary aspect, the device may be configured to retrieve values from the lookup table based on the sum of the received rotation rates from all of the at least three sense axes.

The device may further comprise a temperature sensor, and the device may be configured to retrieve bias error values from the lookup table based on the temperature sensed by the temperature sensor in addition to the sum of received rotation rates.

The device circuitry may be configured to determine the heading of the device by fitting a sine or cosine function to the received rotation rates. The sine function may be of the form $C \sin(\alpha_n+\beta)$ or $C \cos(\alpha_n+\beta)$, where C is the amplitude of the sine function, which depends at least on the latitude of the device, $\alpha_n$ is the offset angle of the nth sense axis and $\beta$ is a phase offset, which has a fixed difference with respect to true north, and the heading of the device may be determined by varying the phase offset $\beta$ to find the value with the minimum error in the fit of the sine function to the received rotation rates. The sine or cosine function may be fit to the received rotation rates using a least squares mean or other fitting method.

The device may further comprise a GNSS receiver or a connection for communicating with a GNSS receiver, and prior to sine fitting the received rotation rates, the device may be configured to receive the latitude of the device from the GNSS receiver; and to calculate the amplitude of the sine function based on the received latitude.

Moreover, the device circuitry may be configured to determine the heading of the device when the range of values of the received rotation rates is below a threshold. The threshold may be at least 10 times the root mean square error of the received rotation rates.

The device may further comprises a GNSS receiver or a connection for communicating with a GNSS receiver and an inertial measurement unit, and the device may be configured to calculate a heading based on the output of the GNSS receiver and the inertial measurement unit; average the rotation rates of the sense axes received from the one or more MEMS gyroscopes over time; calculate the component of the Earth's rotation felt by each sense axis of the one or more MEMS gyroscopes based on the heading calculated based on the output of the GNSS receiver and inertial measurement unit; and determine the bias error of each sense axis of the one or more MEMS gyroscopes by subtracting the calculated component of the Earth's rotation for each sense axis from the average received rotation rate of the sense axis.

The device may be configured to calculate the heading based on the received rotation rates of the one or more MEMS gyroscopes by subtracting the determined bias error for each sense axis of the one or more MEMS gyroscopes from the rotations rate received from the sense axis prior to determining the heading of the device based on the received rotation rates.

The device may further comprise at least one of a yaw gyroscope configured to measure the rotation of the one or more MEMS gyroscopes about an axis perpendicular to the measurement axes of the one or more MEMS gyroscopes, and an inertial measurement unit. The device may be configured to measure movement of the one or more MEMS gyroscopes relative to the surface of the Earth or other planetary body while the rotation rates are being measured by the one or more MEMS gyroscopes and to stabilize the received rotation rates by subtracting the calculated rates caused by the measured movement of the one or more MEMS gyroscopes relative to the surface of the Earth or other planetary body from the received rotation rates before determining the heading of the device.

In another exemplary aspect, the device may be configured to determine the heading of the device by receiving first rotation rates from the one or more MEMS gyroscopes at a first position; measuring the rotation of the one or more MEMS gyroscopes from the first position to a second position; receiving second rotation rates from the one or more MEMS gyroscopes at the second position; calculating a differential rotation rate for each sense axis of the one or more MEMS gyroscopes by subtracting the second received rotation rate of the sense axis received from the MEMS gyroscope from the first received rotation rate of the sense axis received from the MEMS gyroscope or vice versa; and fitting the differential rotation rates to a sine or cosine function to determine a phase offset of the sine or cosine function, wherein the phase offset corresponds to the heading of the device.

The sine or cosine function may be of the form $C[\sin(\beta+\alpha_n)-\sin(\beta+\alpha_n+\theta)]$, or $C[\cos(\beta+\alpha_n)-\cos(\beta+\alpha_n+\theta)]$, where C is the amplitude of the sine or cosine function, $\alpha_n$ is the offset angle of the nth sense axis, $\theta$ is the angle of measured rotation of the one or more MEMS gyroscopes from the first position to the second position, and $\beta$ is the phase offset, and where the phase offset indicates the heading of the device.

The device may be configured to receive multiple first and second rotation rates for each sense axis of the one or more MEMS gyroscopes and to average the received rotation rates over time.

The device may be further configured to estimate the bias error of each sense axis of the one or more MEMS gyroscopes by comparing the first and second rotation rates with calculated rotation rates due to rotation of the Earth or other rotating planetary body in the first and second positions. Estimating the bias error of each sense axis of the one or more MEMS gyroscopes may comprise calculating the bias error b_n of the nth sense axis according to one of the following equations:

$$b_n = \frac{1}{2}[R_{1n} + R_{2n} - C \cdot \{\sin(\beta + \alpha_n) + \sin(\beta + \alpha_n + \theta)\}],$$

$$\text{or } b_n = \frac{1}{2}[R_{1n} + R_{2n} - C \cdot \{\cos(\beta + \alpha_n) + \cos(\beta + \alpha_n + \theta)\}],$$

where $R_{1n}$ is the first received rotation rate of the nth sense axis and $R_{2n}$ is the second received rotation rate of the nth sense axis, and C is the amplitude of the sine or cosine function.

Moreover, the device may be configured to update the bias error value lookup table with the calculated bias errors. The device may be further configured to update the bias error value lookup table based on the measured temperature.

In yet a further exemplary aspect, the device may be configured to measure the rotation of the one or more MEMS gyroscopes from the first position to the second position using at least one of a yaw gyroscope configured to measure the rotation of the one or more MEMS gyroscopes about an axis perpendicular to the sense axes of the one or more MEMS gyroscopes; and an inertial measurement unit.

The device may be configured to measure the rotation of the one or more MEMS gyroscopes from the first position to the second position in response to detecting that the one or more MEMS gyroscopes are rotating out of the first position.

In addition, the device may be configured to rotate the one or more MEMS gyroscopes from the first position to the second position.

The differential rotation rates may be fitted to a sine or cosine function using a least squares mean or other fitting method. The sum of the residuals or the sum of the squares of the residuals may be used as an indication of the accuracy of the heading determination. The device may be configured to increase the averaging time of the received rate signals and/or to rotate the one or more MEMS gyroscopes from the first position to the second position or to a third position when the sum of the residuals or the sum of the squares of the residuals exceeds a threshold.

The device may further comprise an inclinometer or inertial measurement unit for determining the orientation of the one or more MEMS gyroscopes relative to the direction of the Earth's gravitational field, and the circuitry may be configured to use inclination measured by the inclinometer to correct the heading and/or latitude calculations.

The device circuitry may be configured to calculate error corrections based on the inclination of the device after the heading determination based on averaged inclinometer readings taken during the heading determination.

The device may comprise two MEMS gyroscopes, wherein the MEMS gyroscopes include at least two sense axes that lie in the first plane perpendicular to one another, and where the two MEMS gyroscopes are rotated by 180 degrees with respect to one another such that the sense axes of the MEMS gyroscopes are arranged at 90 degree intervals.

According to another exemplary aspect, a method is provided for determining a heading relative to surface of the Earth or other rotating planetary body by a gyrocompass device. In this aspect, the method comprises receiving rotation rates from one or more MEMS gyroscopes, wherein the one or more MEMS gyroscopes provide at least three sense axes, which are arranged such that the sense axes lie within a first plane and each sense axis is offset from the other sense axes by a known offset angle; and determining the heading of the device relative to the surface of the Earth or other rotating planetary body based on the rotation rates received from the one or more MEMS gyroscopes. Said determining the heading of the device comprises fitting a sine or cosine function to the received rotation rates.

The angles of the sense axes of the one or more MEMS gyroscopes may be angled at regular intervals of 360/N, where N is the number of sense axes. N may be an even number such that the sense axes are arranged into pairs of sense axes, where the sense axes in each pair are offset by 180 degrees.

In an exemplary aspect, the method may comprise retrieving values for the bias error of each of the sense axes of the one or more MEMS gyroscopes in a lookup table and subtracting the bias error from the received rotation rates before determining the heading of the device.

Moreover, the retrieving of values from the lookup table may be based on the sum of at least two of the received rotation rates, where the at least two received rotation rates are received from sense axes arranged at regular intervals around 360 degrees such that the component of the Earth's rotation in the rate signals is cancelled in the sum of the at least two received rotation rates.

Retrieving values from the lookup table may be based on the sum of the received rotation rates from all of the at least three sense axes.

Retrieving the bias error values from the lookup table may also be based on a temperature sensed by a temperature sensor in addition to the sum of received rotation rates.

The sine function may be of the form $C \sin(\alpha_n + \beta)$ or $C \cos(\alpha_n + \beta)$, where C is the amplitude of the sine function, which depends at least on the latitude of the device, $\alpha_n$ is the offset angle of the nth sense axis and $\beta$ is a phase offset, which has a fixed difference with respect to true north, and the heading of the device may be determined by varying the phase offset $\beta$ to find the value with the minimum error in the fit of the sine function to the received rotation rates.

The sine or cosine function is fit to the received rotation rates using a least squares mean or other fitting method. The method may further comprise fitting the amplitude of the sine or cosine function to the received rotation rates to determine the latitude of the gyrocompass.

Yet further, the method may further comprise receiving the latitude of the device from a GNSS receiver; and calculating the amplitude of the sine function based on the received latitude.

In an exemplary aspect, the determining of the heading of the device may be performed when the range of values of the received rotation rates is below a threshold. The threshold may be at least 10 times the root mean square error of the received rotation rates.

The method may further comprise calculating a heading based on the output of a GNSS receiver and an inertial measurement unit; averaging the rotation rates of the search axes received from the one or more MEMS gyroscopes over time; calculating the component of the Earth's rotation felt by each sense axis of the one or more MEMS gyroscopes based on the heading calculated based on the output of the GNSS receiver and inertial measurement unit; and determining the bias error of each sense axis of the one or more MEMS gyroscopes by subtracting the calculated component of the Earth's rotation for each sense axis from the average received rotation rate of the sense axis.

The method may further comprise calculating the heading based on the received rotation rates of the one or more MEMS gyroscopes by subtracting the determined bias error for each sense axis from the rotation rate received from the sense axis is performed prior to determining the heading of the device based on the received rotation rates.

The method may further comprise measuring movement of the one or more MEMS gyroscopes relative to the surface of the Earth or other planetary body while the rotation rates are being measured by the one or more MEMS gyroscopes; and stabilizing the received rotation rates by subtracting the calculated rates caused by the measured movement of the one or more MEMS gyroscopes relative to the surface of the Earth or other planetary body from the received rotation rates before determining the heading of the device.

In an exemplary aspect, the determining of the heading of the device may comprise receiving first rotation rates from the one or more MEMS gyroscopes at a first position; measuring the rotation of the one or more MEMS gyroscopes from the first position to a second position; receiving second rotation rates from the one or more MEMS gyroscopes at the second position; calculating a differential rotation rate for each sense axis of the one or more MEMS gyroscopes by subtracting the second rotation rate of the sense received from the MEMS gyroscope from the first received rotation rate of the sense axis received from the MEMS gyroscope or vice versa; and fitting the differential rotation rates to a sine or cosine function to determine a phase offset of the sine or cosine function, wherein the phase offset corresponds to the heading of the device.

The sine or cosine function may be of the form $C[\sin(\beta + \alpha_n) - \sin(\beta + \alpha_n + \theta)]$, or $C[\cos(\beta + \alpha_n) - \cos(\beta + \alpha_n + \theta)]$, where C is the amplitude of the sine or cosine function, $\alpha_n$ is the offset angle of the nth sense axis, $\theta$ is the angle of measured rotation of the one or more MEMS gyroscopes from the first position to the second position, and $\beta$ is the phase offset, and wherein the phase offset indicates the heading of the device.

Multiple first and second rotation rates may be received for each sense axis of the one of more MEMS gyroscopes and be averaged over time.

The method may further comprise estimating the bias error of each sense axis of the one of more MEMS gyroscopes by comparing the first and second rotation rates with calculated rotation rates due to rotation of the Earth or other rotating planetary body in the first and second positions.

Estimating the bias error of each sense axis of the one or more MEMS gyroscopes may comprise calculating the bias error $b_n$ of the nth sense axis according to one of the following equations $$b_n = \frac{1}{2}[R_{1n} + R_{2n} - C \cdot \{\sin(\beta + \alpha_n) + \sin(\beta + \alpha_n + \theta)\}],$$

$$\text{or } b_n = \frac{1}{2}[R_{1n} + R_{2n} - C \cdot \{\cos(\beta + \alpha_n) + \cos(\beta + \alpha_n + \theta)\}],$$

where $R_{1n}$ is the first received rotation rate of the nth sense axis and $R_{2n}$ is the second received rotation rate of the nth sense axis, and C is the amplitude of the sine or cosine function.

Yet further, the method may further comprise updating the bias error value lookup table with the calculated bias errors. The method may still further comprise updating the bias error value lookup table based on the measured temperature.

Moreover, the measuring of the rotation of the one or more MEMS gyroscopes from the first position to the second position may be based on the output of at least one of a yaw gyroscope configured to measure the rotation of the one or more MEMS gyroscopes about an axis perpendicular to the sense axes of the one or more MEMS gyroscopes; and an inertial measurement unit.

According to an exemplary aspect, the measuring of the rotation of the one or more MEMS gyroscopes from the first position to the second position may be performed in response to detecting that the one or more MEMS gyroscopes are rotating out of the first position.

The method may further comprise rotating the one or more MEMS gyroscopes from the first position to the second position.

The differential rotation rates may be fitted to a sine or cosine function using a least squares mean or other fitting method. The sum of the residuals or the sum of the squares of the residuals is used as an indication of the accuracy of the heading determination. The method may further comprise increasing the averaging time of the received rate signals and/or rotating the one or more MEMS gyroscopes from the first position to the second position or to a third position when the sum of the residuals or the sum of the squares of the residuals exceeds a threshold.

The method may further comprise determining the orientation of the first plane relative to the direction of the Earth's gravitational field, and correcting the heading and/or latitude calculations based on the determined orientation.

The method may further comprise calculating error corrections based on the orientation of the device based on averaged orientation determinations made during the heading determination.

The one or more MEMS gyroscopes may comprise two MEMS gyroscopes, wherein the MEMS gyroscopes include at least two sense axes that lie in the first plane perpendicular to one another, and where the two MEMS gyroscopes are rotated by 180 degrees with respect to one another such that the sense axes of the MEMS gyroscopes are arranged at 90-degree intervals.

DETAILED DESCRIPTION

Figure 1A:
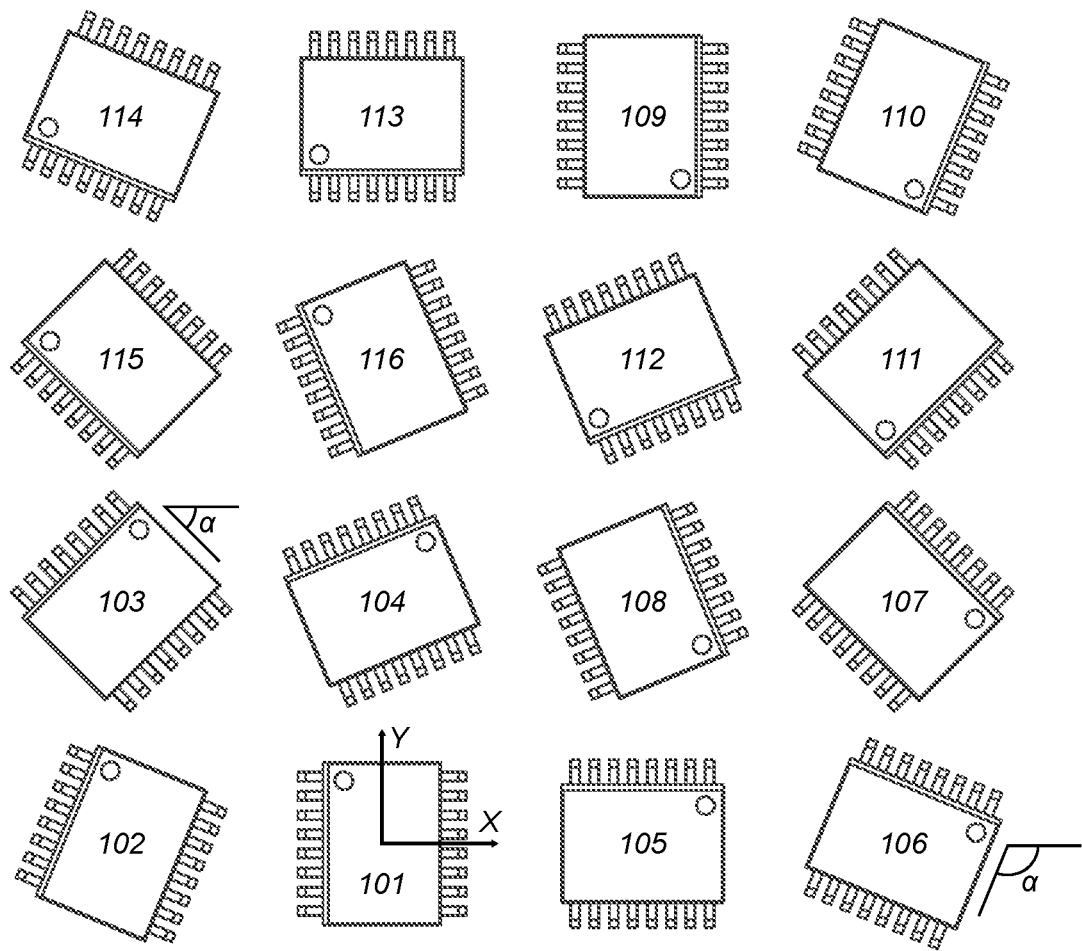
FIGS. 1A and 1B illustrate exemplary aspects of the arrangement of MEMS gyroscopes in embodiments of the MEMS gyrocompass.
Figure 1B:
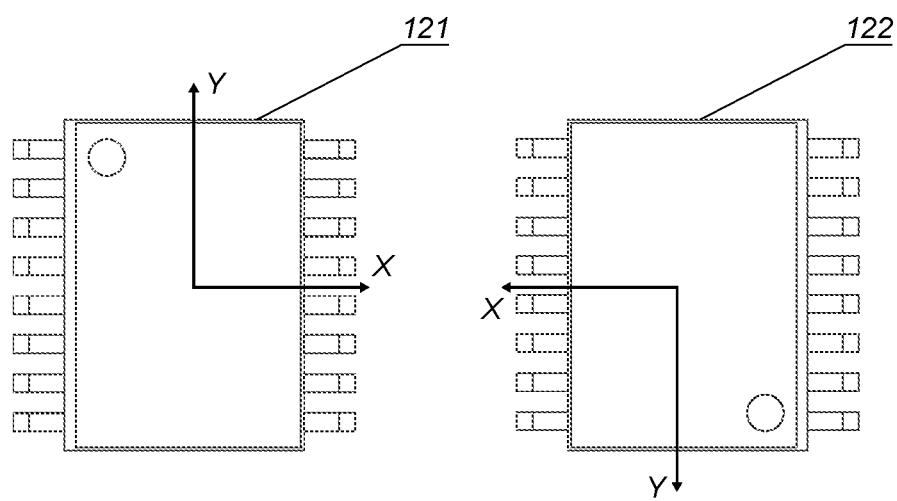

FIGS. 1A and 1B illustrate exemplary configurations of MEMS gyroscopes in a MEMS gyrocompass of the present invention. In general, FIG. 1A illustrates sixteen MEMS gyroscopes 101 to 116 arranged on a substrate that lies parallel to the plane of the page. In other words, the MEMS gyroscopes 101 to 116 are fixed in a known orientation on a planar substrate, such as a circuit board, for example. It is noted that while FIG. 1A illustrates sixteen MEMS gyroscopes, the exemplary embodiment can be configured to function with any number of MEMS gyroscopes, as long as the gyroscopes provide at least three sense axes that are offset from one another. For example, two identical two-axis MEMS gyroscopes can provide four offset sense axes when the two-axis MEMS gyroscopes are rotated with respect to one another (e.g., by any angle other than 90 degrees or 270 degrees. This is shown in another arrangement, illustrated in FIG. 1B, in which the MEMS gyrocompass includes two two-axis MEMS gyroscopes 121 and 122 that are rotated by 180 degrees relative to one another. This arrangement of two MEMS gyroscopes provides four sense axes that are arranged at intervals of 90 degrees. Of course, other gyroscopes could be used in the same arrangement illustrated in FIG. 1B, such as three-axis gyroscopes or gyroscopes that are part of a 6-degrees-of-freedom inertial measurement unit, as long as there are at least three offset sense axes provided by the two gyroscopes. In another embodiment (not shown), a single MEMS gyroscope may be manufactured and used in the gyrocompass that includes an arbitrary number of offset measurement axes within a single package.

In an exemplary aspect, the MEMS gyrocompass is a device that includes one or more of the MEMS gyroscopes 101 to 116 and also includes electronic circuitry configured to perform the algorithms and functions described herein. For example, the electronic circuitry can include a processor (e.g., a CPU or microprocessor) configured to execute instructions stored on electronic memory, that when executed, perform the algorithms and calculations for determining the heading of the gyrocompass device. In an exemplary aspect, the electronic circuitry can be configured as a heading determiner that receives rotation rates from the at least three sense axes of each of the MEMS gyroscopes and further determines the heading of the gyrocompass device relative to the surface of a rotating planetary body (e.g., Earth) by fitting a sine or cosine function to the received rotation rates from the one or more MEMS gyroscopes.

In an exemplary aspect, FIG. 1A illustrates the X sense axis and Y axis (which is optionally also a sense axis) of MEMS gyroscope 101. The X and Y axes of each of the other gyroscopes 102 to 116 are oriented with respect to the package of each gyroscope 102 to 116 in the same manner as the X and Y axes of gyroscope 101 are oriented with respect to its package, as shown in FIG. 1A. As further shown, the X and Y axes of each of the gyroscopes 101 to 116 are offset from one another by an offset angle α, examples of which are shown in FIG. 1A for gyroscopes 103 and 106, showing the offset of the X sense axes of the gyroscopes 103 and 106 relative to the X sense axis of gyroscope 101. In the arrangement of sixteen MEMS gyroscopes shown in FIG. 1A, the gyroscopes are oriented at regular rotational intervals of 22.5 degrees, i.e., 360 degrees divided by 16, which is the number of gyroscopes. Thus, the X sense axis of gyroscope 102 is rotated 22.5 degrees clockwise from the X sense axis of gyroscope 101. The X sense axis of gyroscope 103 is, in turn, rotated 22.5 degrees clockwise from the X sense axis of gyroscope 102, and so on.

In an exemplary aspect, the sense axes of the MEMS gyroscopes that comprise the gyrocompass are preferably arranged at regular rotational intervals with respect to one another. Ideally, the interval between the sense axes a is a multiple of 360/N, where N is the number of sense axes. Thus, where the MEMS gyroscopes, such as MEMS gyroscopes 101 to 116, are of the same type, i.e., where the sense axes are oriented in the same direction with respect to the gyroscope package, this can be seen as the assembly angle of each MEMS gyroscope corresponding to the interval α, which is preferably a multiple of 360/N, where N is the number of gyroscopes.

In alternative aspects, the orientations of the MEMS gyroscopes' sense axes are not necessarily equally spaced around 360 degrees as long as the orientations are precisely known and can be later used when determining the orientation of the device as would be appreciated to one skilled in the art.

The Z axes of all of the MEMS gyroscopes 101 to 116 (which are also optionally sense axes) extends out of the page towards the reader. The Z axes of all of the gyroscopes are parallel to one another. However, in alternative aspects, the MEMS gyroscopes that form the MEMS gyrocompass do not necessarily have a sense axis in the Z-direction. Each of the MEMS gyroscopes can be a single-axis gyroscope.

Each of the sense axes of MEMS gyroscopes 101 to 116 of FIG. 1A or 121 and 122 of FIG. 1B measures a different contribution of the Earth's rotation, and when the substrate is parallel to the surface of the Earth, i.e. when the Z axes of the MEMS gyroscopes are parallel to the direction of gravity, the component of the Earth's rotation felt in degrees per hour by each gyroscope follows the following equation:

$$15 \cdot \cos(\varphi) \cdot \sin(\alpha_n + \beta) \quad (1)$$

where $\varphi$ is the latitude of the gyrocompass, $\alpha_n$ is the offset angle of the nth sense axis, and $\beta$ is a phase offset. The rotation rates measured by the MEMS gyroscopes 101 to 116 or 121 and 122 can be fitted to the expected measured sine function if the device were in a known heading (e.g., such that the X sense axis of the gyroscope 101 is aligned with true north) by varying the phase value $\beta$. The best-fit value of $\beta$ therefore indicates the difference between the orientation of the gyrocompass and the known heading, thus allowing the heading of the gyrocompass to be determined.

Fitting the measured rotation rates to the sine function may be performed with any suitable fitting technique, such as least squares fitting. It will be appreciated that the sine function is equation (1) may be trivially replaced by a cosine function. This change only affects the way that the phase offset $\beta$ is interpreted, shifting it by 90 degrees.

The heading determining process is simpler if the latitude, $\varphi$, of the gyrocompass is known with precision of a few degrees. Such a determination may be made, for example, using GPS, where available, or by geocoding user input, where a rough location (e.g. city or state) is known. However, where high-performing MEMS gyroscopes 101 to 116 or 121 and 122 are used in the gyrocompass, the amplitude of the sine wave and thus the latitude can also be determined from the measured data by fitting.

The component of equation (1) that defines the amplitude of the sine wave, i.e. 15·cos($\varphi$), may differ depending on the inclination of the MEMS gyroscopes 101 to 116 or 121 and 122. Furthermore, if the MEMS gyrocompass is to be used on a planetary body other than Earth, the amplitude of 15 degrees per hour may also differ, depending on the period of rotation of that planetary body. Thus, where the term 15·cos($\varphi$) appears in the equations described herein, it will be appreciated that it may be replaced with other terms depending on the inclination of the MEMS gyroscopes and the rotation rate of the planetary body without departing from the principles of the present invention. For example, a more general term R cos($\sigma$) may be used instead, where R corresponds to the rotational rate of the planetary body and $\sigma$ is the angular difference between the plane of the sense axes of the MEMS gyroscopes 101 to 116 or 121 and 122 and a plane tangential to the surface of the planetary body at the same longitude at the equator.

In a first embodiment, the heading determination should be conducted only when the gyrocompass is essentially stationary relative to the surface of the Earth. As such, the rotation rates received from each gyroscope 101 to 116 or 121 and 122 essentially include just the rotation rate of the Earth, according to equation (1), the bias error and noise. The stationary status of the gyrocompass may be determined based on a range of collected samples from each gyroscope 101 to 116 or 121 and 122. When the range of the samples is less than pre-defined threshold value, the heading determination is performed. Criticizing the data for external disturbances before using it in further calculation ensures that the compass is stationary and results are not disturbed by motion that is not part of the Earth's rotation. A suitable value for the threshold is ten times the RMS noise of each gyroscope, although other thresholds may be used in alternative aspects. The threshold may be determined experimentally for a given type of MEMS gyroscope used in the gyrocompass. Once the range of samples falls below the threshold, an average (e.g. mean) received rotation rate may be determined over a number of received samples for each MEMS gyroscope 101 to 116 or 121 and 122 in order to minimize the effect of noise, and the average received rotation rate may then be used in the heading determination, i.e. sine fitting.

Figure 2:
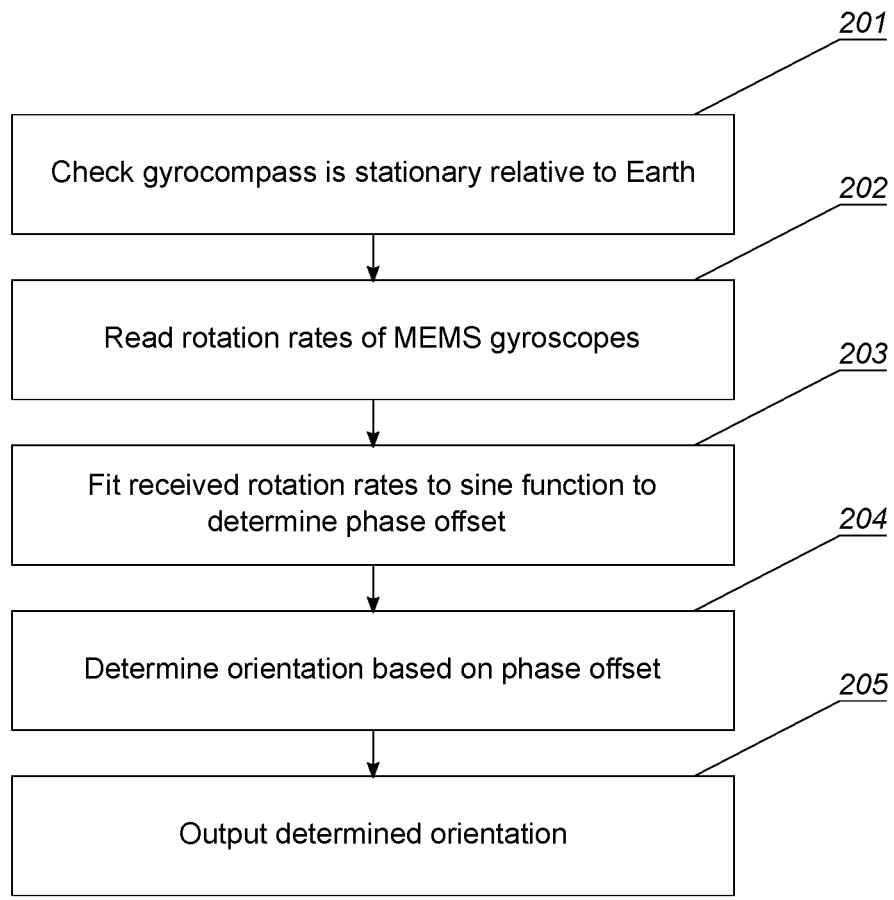
FIG. 2 illustrates a first method for determining a heading.

The method of the first embodiment is illustrated in FIG. 2. At step 201, the MEMS gyrocompass determines whether it is stationary relative to the surface of the Earth, for example using the threshold method described above. At step 202, the rotations rates of MEMS gyroscopes 101 to 116 or 121 and 122 are read and averaged and, at step 203, the read rotation rates are fit to the sine function of equation (1) based on the known offset angles of each of the sense axes of MEMS gyroscope 101 to 116 or 121 and 122. From the sine function fit, the phase offset β is determined. At step 204, the heading of the device is determined based on the phase offset β. This step may be trivial (or even skipped) if the phase offset β is measured such that zero indicates true north, in which case the phase offset β may be output directly as the determined heading at step 205. If another compass direction than north corresponds to β=0, then a simple calculation may be done to provide an indication of the heading angle. In other applications, where lower precision is required, the phase offset β may be converted into a compass direction, e.g., north, north-east, east, etc. and output in that form.

Following step 203 above, the sum of the residuals or the sum of the squares of the residuals can be used as an indication of the accuracy of the heading determination. The sum of residuals or sum of squares of the residuals may be compared to a threshold and, if the sum exceeds the threshold, the averaging time of the rates received from the MEMS gyroscopes 101 to 116 or 121 and 122 may be increased in order to reduce the effect of noise on the measurements. Furthermore, if the sum exceeds the same or a different threshold, the gyrocompass may perform a rotation determination and/or bias error estimate as described with respect to FIG. 4 or 5 below.

In a second embodiment, where all significant angular motion of the gyrocompass, which affects the measurements of the Earth's rotation rate obtained by the gyroscopes, is known, it is not essential for the gyrocompass to be stationary. Thus, in a second embodiment, the gyrocompass may further include an inertial measurement unit (IMU) for measuring the movement of the gyrocompass relative to the Earth, and this measured motion can be subtracted from the gyroscope data in order to stabilize the readings. Alternatively, one or more of the MEMS gyroscopes 101 to 116 or 121 and 122 may also include a sense axis in the vertical direction, i.e., perpendicular to the surface of the Earth when the sense axis (or axes) for measuring the Earth's rotation are parallel to the surface. The rotation rate measured by the vertical sense axis or overall motion measured by the IMU may be used to compensate for rotation of the gyrocompass during the heading determination. In this case, an accelerometer may also be provided in order to provide more information about movement of the MEMS gyrocompass. In a further alternative, one or more of the MEMS gyroscopes 101 to 116 or 121 and 122 may be the IMU, e.g. comprising a three-axis gyroscope and three-axis accelerometer.

Figure 3:
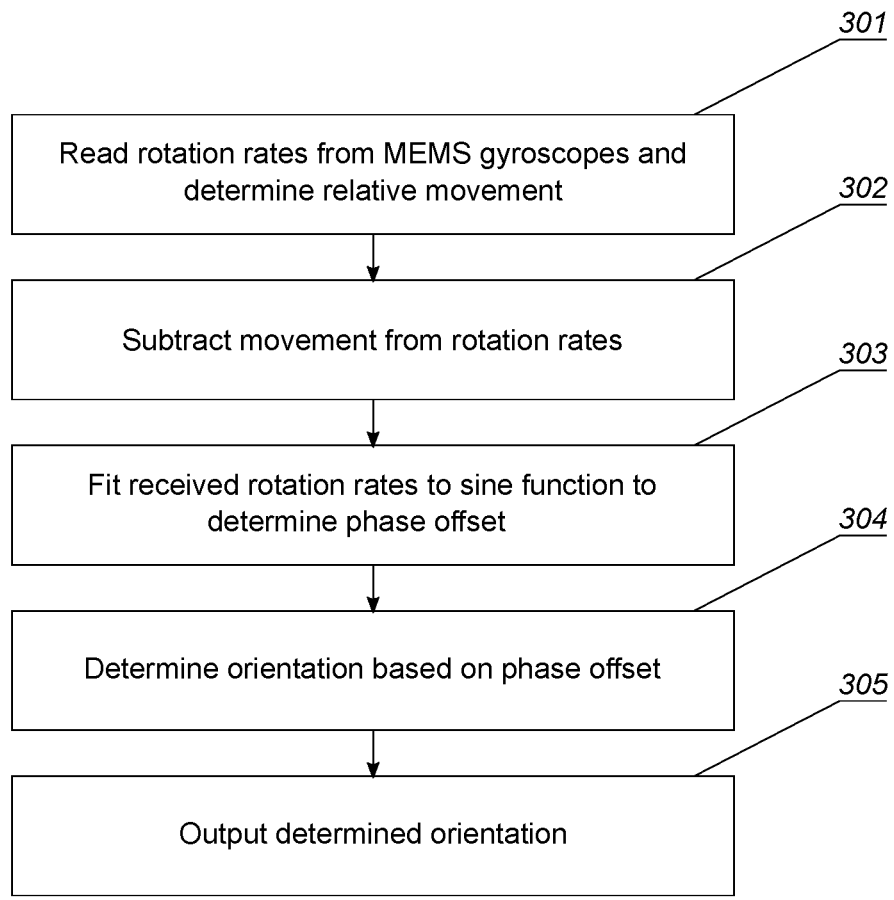
FIG. 3 illustrates a second method for determining a heading.

The method of the second embodiment is shown in FIG. 3. At step 301, rotation rates are read from the MEMS gyroscopes 101 to 116 or 121 and 122 while movement of the MEMS gyrocompass relative to the surface of the Earth is simultaneously measured. At step 302, the read rotation rates from the MEMS gyroscopes 101 to 116 or 121 and 122 are stabilized by subtracting the calculated rates from the measured relative movement of the gyrocompass. The resulting rotation rates will subsequently be used in the heading determination at steps 303 to 305. Steps 303 to 305 proceed as described above with respect to steps 203 to 205.

In a third embodiment, the MEMS gyrocompass may make use of passive turns of the device in order to determine the bias errors of the individual gyroscopes 101 to 116 or 121 and 122, or indeed the bias errors of the individual axes of each gyroscope where multi-axis gyroscopes are used, which affect the heading determination calculation. In this context and for purposes of this disclosure, the term "passive turn" means any partial or complete rotation of the gyrocompass about the yaw axis, i.e., the axis perpendicular to all of the sense axes of the gyroscopes illustrated in FIG. 1A or FIG. 1B, that the gyrocompass device is subject to due to externally applied force. For example, if the gyrocompass device is deployed in a vehicle, as the vehicle turns, the gyrocompass is also turned, and this turn may be used in the method described below. In order to take advantage of such passive turns, the MEMS gyrocompass further includes at least one yaw gyroscope with a sense axis arranged perpendicular to the sense axes of MEMS gyroscopes 101 to 116 or 121 and 122. This gyroscope therefore can be configured to measure rotation of the MEMS gyrocompass relative to the surface of the Earth. This gyroscope may be one of the MEMS gyroscopes 101 to 116 or 121 and 122 that is used in the heading determination itself, or may be a separate gyroscope, e.g. part of an inertial measurement unit. Again, in a further alternative, one or more of the MEMS gyroscopes 101 to 116 or 121 and 122 may be an IMU, e.g., comprising a three-axis gyroscope and three-axis accelerometer.

Figure 4:
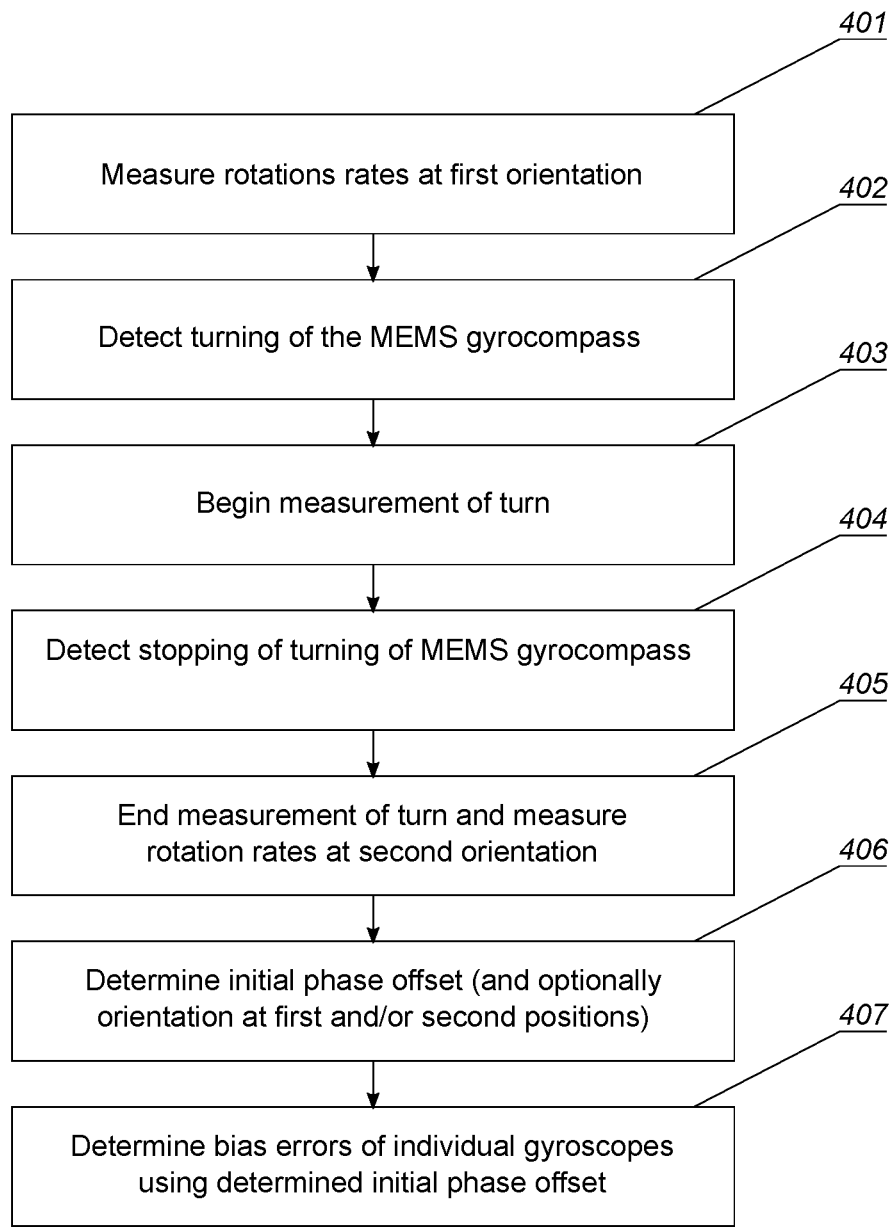
FIG. 4 illustrates a method for using passive turns of the MEMS gyroscope to determine the heading and/or bias errors of the MEMS gyroscopes.
Figure 5:
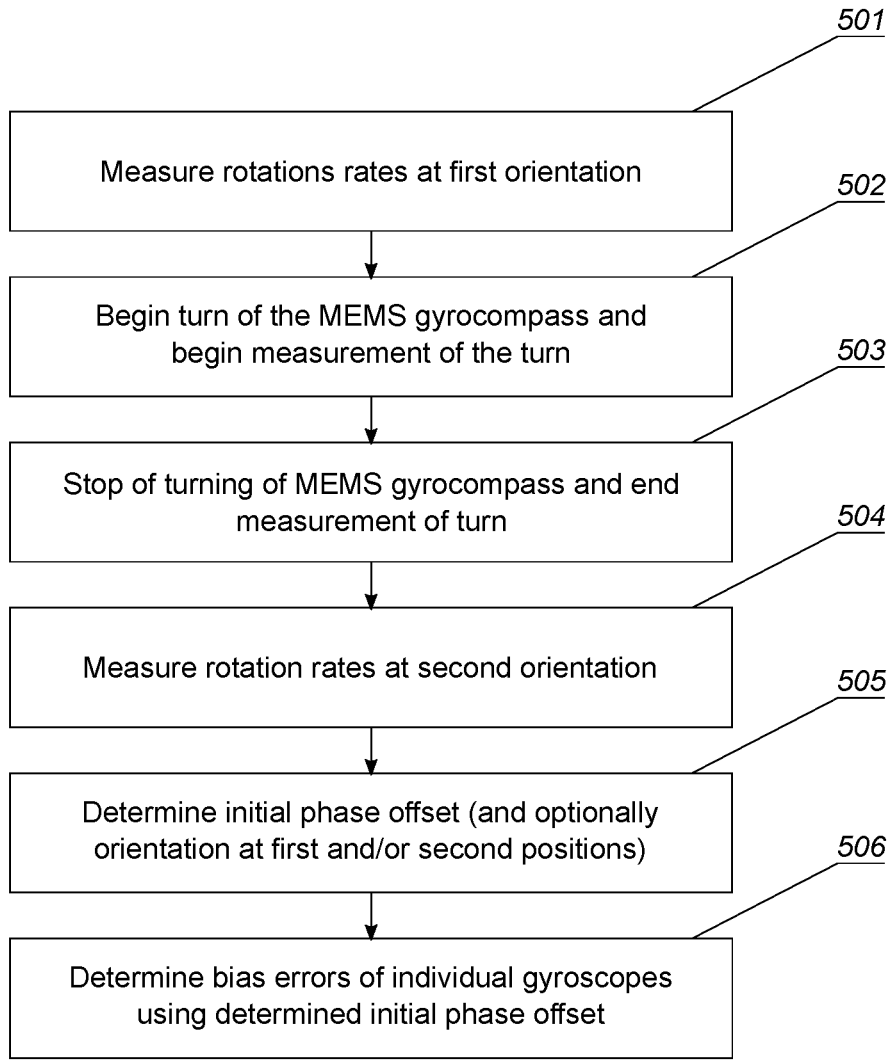
FIG. 5 illustrates a method for using active turns of the MEMS gyroscope to determine the heading and/or bias errors of the MEMS gyroscopes.

The method is illustrated in FIG. 4. At step 401, at a first, stationary position (with respect to the surface of the Earth) before a passive turn is detected, the measured rotation rates of each MEMS gyroscope 101 to 116 or 121 and 122 are recorded and averaged over time in order to minimize the effect of noise on the received rotation rates. Thus, following step 401, the rotation rates $R_{1n}$ of each of the sense axes are known, where the individual rates $R_{1n}=\gamma_{1n}+b_n$, $\gamma_{1n}$ is the static angular rate which is assumed to be primarily made up of the Earth's rotation, measured by the nth sense axis at the first position, and $b_n$ is the bias error of the nth sense axis.

At step 402, rotation of the MEMS gyrocompass about the yaw axis is detected. Following detection of the rotation, time integration of the yaw rate signal (or other measurement of the turn) begins at step 403. When it is detected that the rotation has stopped at step 404, the time integration of the yaw rate signal is stopped at step 405. The integrated yaw rate signal (or other measurement of the turn) reveals the turn angle θ.

Alternatively, sensor fusion, e.g., Kalman filtering, may be employed instead of time integration of the yaw rate signal to estimate the turn angle θ. Preferably, a 6 degrees-of-freedom inertial measurement unit is provided instead of the yaw gyroscope. This method improves the accuracy of the heading change estimation significantly and takes also into account the real 3D orientations instead of just the in-plane component. Furthermore, when using advanced sensor fusion algorithms such as Kalman filtering, the system benefits from using slanted axes, i.e., where the substrate, on which the MEMS gyroscopes 101 to 116 or 121 and 122 are located, is inclined with respect to the horizontal plane. In this arrangement, yaw angle and earth rotation measurements are linear combinations of gyroscope readings and inclination angle data and can improve gyroscope bias error estimation significantly.

Following the turn, at step 405, the measured rotation rates of each sense axis are again recorded at a second stationary position (with respect to the surface of the Earth) and averaged over time, as in step 401, to provide a second set of rotation rates $R_{2n}$, where $R_{2n}=\gamma_{2n}+b_{2n}$, $\gamma_{2n}$ is the static angular rate which is assumed to be primarily made up of the Earth's rotation, measured by the nth gyroscope at the second position, and $b_n$ is the bias error of the nth sense axis. Due to the relatively short time between the measurement of the rates $R_{1n}$ and $R_{2n}$ for the bias error to change, the bias error $b_n$ can be assumed to be the same in both measurements.

At step 406, the two sets of received rotation rates $R_{1n}$ and $R_{2n}$ and the measured turn angle θ are used to determine the heading of the gyrocompass. Using equation (1) above, the difference between the rotation rates $R_{1n}$ and $R_{2n}$ can be expressed as:

$$R_{1n} - R_{2n} = 15 \cdot \cos(\varphi) \cdot \{\sin(\beta+\alpha_n) - \sin(\beta+\alpha_n+\theta)\} \quad (2)$$

from which the unknown phase offset β, which corresponds to the heading of the gyrocompass in the initial position, before the turn, can be determined by fitting equation (2) to the data. The current heading of the gyrocompass, following the turn, can be determined by adding the measured turn angle θ to the determined heading in the first position, before the turn. The differential rotation rates, i.e., $R_{1n}$–$R_{2n}$, are fitted to a sine or cosine function using a least squares or other fitting method. The sum of the residuals or the sum of the squares of the residuals can be used as an indication of the accuracy of the heading determination.

This method of determining the heading is particularly advantageous because it can still provide an accurate indication of the heading even when the bias errors $b_n$ are large. However, the passive turn can also be advantageously used to determine the bias errors $b_n$. Thus, a passive turn, which may not always coincide with the need for a heading determination, may be primarily used to determine the bias errors, which can then be used in the methods of either the first or second embodiments described above and illustrated in FIGS. 2 and 3 respectively by subtracting the determined bias errors $b_n$ from the received rotation rates before sine-fitting.

In order to determine the bias errors $b_n$, the method of FIG. 4 includes a further step 407 following determination of the initial phase offset β in the first position in which the bias errors for each sense axis $b_n$ are calculated according to equation (3) (or an equivalent equation if equation (1) uses a cosine instead of sine function).

$$b_n = \frac{1}{2}[R_{1n} + R_{2n} - 15 \cdot \cos(\varphi) \cdot \{\sin(\beta + \alpha_n) + \sin(\beta + \alpha_n + \theta)\}] \quad (3)$$

After the bias errors $b_n$ for each sense axis of gyroscopes 101 to 116 or 121 and 122 have been determined at step 407, they may be stored in a memory of the gyrocompass device to be accessed during the heading determination carried out according to the methods of FIG. 2 or 3, as described above. The gyrocompass may continually update the stored bias errors based on passive turns of the gyrocompass whenever the opportunity arises or following a minimum elapsed time since the last update.

In an alternative method for determining gyroscope bias errors, a process analogous to maytagging may be used with the MEMS gyrocompass illustrated in FIG. 1A or FIG. 1B, for example. The rotation rates $R_{1n}$ of the sense axes of MEMS gyroscopes 101 to 116 or 121 and 122 are read at a first position, then subsequently all of the MEMS gyroscopes 101 to 116 or 121 and 122 are rotated by 180 degrees to a second position, at which the rotation rates $R_{2n}$ of the MEMS gyroscopes 101 to 116 or 121 and 122 are read again. For a given phase offset β, when the MEMS gyroscope—and thus the sense axis, is rotated by 180 degrees, the rotation rate measured by the gyroscope following the rotation is:

$$R_{1n} = 15 \cdot \cos(\varphi) \cdot \sin(\alpha_x + \beta) + b_n \quad (4)$$

$$R_{2n} = 15 \cdot \cos(\varphi) \cdot \sin(\alpha_x + \beta + 180) + b_n \quad (5)$$

$$= -15 \cdot \cos(\varphi) \cdot \sin(\alpha_x + \beta) + b_n \quad (6)$$

Thus, by subtracting the second measurement $R_{2n}$ from the first measurement $R_{1n}$ and halving the result, the bias error $b_n$ is cancelled and the true rotation rate is retained. The resulting values, once the step has been repeated for all of the MEMS gyroscopes 101 to 116 or 121 and 122, can again be fit to the equation (1), as described above. Similarly, by summing the first measurement $R_{1n}$ and second measurement $R_{2n}$ and halving the result, the static rotation rate due to the Earth's rotation is cancelled, leaving only the bias error $b_n$.

However, in comparison to a MEMS gyrocompass including at most one or two sense axes, which use repeated 180-degree rotations in order to determine the heading of the device, the gyrocompass of the present invention requires only a single turn, since the heading of the device can be determined using sine-fitting of the rate signals from the three or more sense axes of gyroscopes 101 to 116 or 121 and 122.

Furthermore, in a MEMS gyrocompass including at most one or two sense axes, such a turn must be an accurate 180 degree rotation in order for the component of the rate signal caused by the Earth's rotation to be cancelled in the calculation of the bias errors $b_n$ described above; however, in the device of the present invention, which includes MEMS gyroscopes 101 to 116 or 121 and 122 with at least three sense axes, the angle of rotation is not necessarily 180 degrees, nor is it necessary that the rotation mechanism provides a precise rotation angle. Specifically, the method described above with respect to FIG. 4, can be used with active turns of the gyroscopes 101 to 116 or 121 and 122 instead of relying on passive turns of opportunity. An active turn of the gyroscope 101 to 116 or 121 and 122 may be provided by an actuator that is part of the gyrocompass device itself or may be provided by prompting turning of the device or system in which the gyrocompass is installed. For example, the gyroscopes 101 to 116 or 121 and 122 may be arranged on a rotatable platform and an actuator may rotate the platform with respect to the rest of the device. Alternatively, if the gyrocompass is installed in a smartphone, the user of the smartphone may be prompted to rotate the smartphone before a heading determination is performed. This method is described in more detail with respect to FIG. 5.

In particular, at step 501, the measured rotation rates of each of the sense axes of MEMS gyroscopes 101 to 116 or 121 and 122 are recorded and averaged over time in order to minimize the effect of noise on the received rotation rates. At step 502, the MEMS gyroscopes 101 to 116 or 121 and 122 are rotated by an arbitrary angle to a second position. While the MEMS gyroscopes are being rotated, the rotation is measured, for example, by integrating the rate signal of a yaw-axis gyroscope or using an IMU and sensor fusion, as described above with respect to step 403 of FIG. 4. At step 503, the rotation of the MEMS gyroscopes 101 to 116 or 121 and 122 is stopped and measurement of the rotation ends. At step 504, at the second position the measured rotation rates of each sense axis of MEMS gyroscopes 101 to 116 or 121 and 122 are recorded and averaged over time. At step 505, the initial phase offset β of in the first position is determined according to the same method as described above with respect to step 406 of FIG. 4. Again, the sum of the residuals or the sum of the squares of the residuals can be used as an indication of the accuracy of the heading determination. At step 506, the bias error of each sense axis of the MEMS gyroscopes is determined by comparing the measured rotation with the difference between the determined headings at the first and second positions.

In a further method for compensating for bias error, the MEMS gyrocompass can be configured to use a lookup table with known bias error values for each MEMS gyroscope or each sense axis that can be used to correct the received rotation rates.

The bias error of each MEMS gyroscope 101 to 116 or 121 and 122 and their sense axes changes over time and based on the temperature of the MEMS gyroscope, so a measurement of the bias error according to one of the methods described above potentially needs to be repeated periodically as time and temperature conditions change.

In an exemplary aspect, the bias errors can be viewed as functions of time and temperature. When the MEMS gyroscopes 101 to 116 or 121 and 122 are arranged with their sense axes at regular intervals 360/N degrees apart, where N is the number of sense axes, the component of the received rotation rates that arises from the rotation of the Earth is cancelled out in the sum of the received rotation rates. Thus, the simple sum of the received rates provides the sum of the bias errors at the time of measurement, which itself corresponds to a point in time since the device was powered on, and can therefore be used to look up the values of the bias errors for each MEMS gyroscope 101 to 116 or 121 and 122 in the lookup table. A temperature sensor can also be included in the MEMS gyrocompass in order to provide the temperature measurement.

The bias error values can be subsequently retrieved from the lookup table, which is stored in memory of the MEMS gyrocompass or elsewhere, based on the sum of bias errors, and optionally temperature, and subtracted from the received rotation rates before the rates are fitted to the sine function according to equation (1), as described above with respect to the methods shown in FIGS. 2 and 3.

Figure 6:
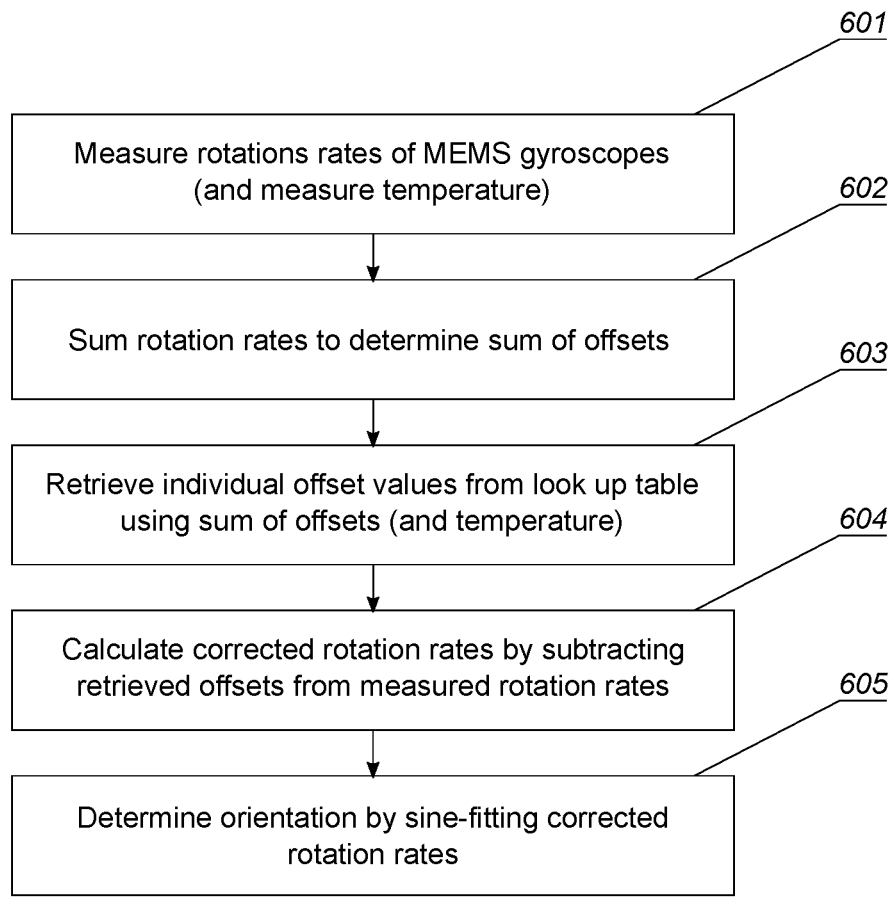
FIG. 6 illustrates a method for determining a heading using stored bias error values retrieved from a lookup table.

FIG. 6 illustrates a method for determining the heading of the MEMS gyrocompass using the lookup table mentioned above. At step 601, the rotation rates of the MEMS gyroscopes 101 to 116 or 121 and 122 are measured/read. Optionally, the temperature of the device/the MEMS gyroscopes 101 to 116 or 121 and 122 is also measured at the same time.

At step 602, the measured rotation rates are summed. As mentioned above, due to the regular arrangement of the sense axes of MEMS gyroscopes 101 to 116 or 121 and 122 at regular intervals 360/N degrees apart, the Earth's rotation is cancelled in the sum of the received rotation rates, leaving only the sum of the bias errors. Alternatively, instead of determining and using the sum of all of the received rotation rates to look up bias error values, it is also possible to use the sums of other combinations of the sense axes for this purpose, as long as the Earth's rotation rate is cancelled in the sum. In practice, this means that the rates of any subset of the sense axes that are arranged regularly around 360 degrees can be used to lookup the bias.

At step 603, the individual bias error values for each axis of the MEMS gyroscopes 101 to 116 or 121 and 122 are retrieved from the lookup table based on the sum(s) of the bias errors and, if available, the temperature.

At step 604, the retrieved bias errors are subtracted from the measured rotation rates to provide corrected rotation rates. At step 605, the sine-fitting method for determining the heading of the MEMS gyroscopes described above with respect to FIG. 2 or 3 is performed using the corrected rotation rates.

In this aspect, the bias error lookup table can be initialized by measuring the reported rotation rates of each MEMS gyroscope 101 to 116 or 121 and 122 in each gyroscope over time, for example, over a 24 hour period. Preferably, this is performed after the MEMS gyrocompass has been manufactured, rather than based on the individual MEMS gyroscopes before assembly into the gyrocompass. The measured rotation rates and temperature are measured over the initialization time period while the device is stationary. The bias error lookup table is populated with at least the individual bias errors for each sense axis of the MEMS gyroscopes 101 to 116 or 121 and 122 at discrete time steps and optionally at different temperature steps or ranges.

The bias error lookup table can be updated, either subsequently to or instead of initialization, during use of the MEMS gyrocompass. When the MEMS gyrocompass includes or is combined with an IMU, which detects any change in position while the system is powered, the bias error lookup table can be updated during operation when the device is stationary.

In general, it is noted that any of the methods described above with respect to FIGS. 4 and 5 for identifying the bias errors using passive or active rotation of the MEMS gyroscopes 101 to 116 or 121 and 122 can be used to populate the lookup table.

In order to save the required memory used by the bias error lookup table, the bias error data can be measured at lengthening, i.e., non-uniform, intervals, since the drift rate decreases with time. The number of cells in the bias error lookup table is roughly m×n×(x+2), where m is the number of temperature points, for example, 10, x is the number of sense axes of the MEMS gyroscopes 101 to 116 or 121 and 122, and the +2 refers to stored optional stored sum and time values. The size of the lookup table can thus be kept below a few thousand cells. It is not necessary to store the sum of the bias errors or the time in the bias error table, since the sum, which is used to look-up the individual bias error values, can be calculated from the individual bias error values, and the time value is not necessary for the basic function of the lookup table. However, pre-calculating and storing the sum values speeds up the look-up time when the lookup table is accessed in operation. The time value, while not strictly necessary, allows the calculation of drift rate. The drift rate may be used in cases where the bias error drift is not monotonic. Moreover, the drift rate decreases significantly when the operation time increases, therefore by splitting the table into two or more monotonic parts the drift rate allows the correct part of table to be identified.

In all of the embodiments described above, the MEMS gyrocompass may further comprise one or more accelerometers for determining the inclination of the MEMS gyroscopes with respect to the direction of gravity. Where the MEMS gyrocompass includes an inertial measurement unit, the inclination of the MEMS gyroscopes may be determined by the IMU, rather than a further separate accelerometer. Samples from the one or more accelerometers are collected at the same time as the rotation rates are collected from the MEMS gyroscopes for the heading determination with respect to true north. The inclination of the MEMS gyroscopes affects both latitude and heading determination results, thus, error corrections due to the inclination of the MEMS gyroscopes can be calculated after the heading calculation based on averaged accelerometer readings over the rotation rate sampling period.

Alternative way of determining the bias errors may be used instead of or in addition to the methods described above when the gyrocompass includes a GPS receiver (or any other GNSS receiver or a connection for communicating with a GNSS receiver) and an inertial measurement unit. The heading of the device can be calculated based on the GPS and IMU measurements. The component of the Earth's rotation felt by each MEMS gyroscope/sense axis is calculated based on the heading determined from the GPS and IMU measurements and then subtracted from an average received rotation rate received from the respective sense axis of the MEMS gyroscope 101 to 116 or 121 and 122. Motion of gyrocompass is averaged out in the average received rotation rates, so following the subtraction only the bias error of each MEMS gyroscope remains. The bias errors can then be used in subsequent heading determinations based on the received rotations rates from the MEMS gyroscopes.

In general, it is noted that while the exemplary aspects of the present invention have been described above with respect to determining the heading of the MEMS gyrocompass relative to the surface of the Earth, it should be appreciated that the exemplary aspects of the invention can function in the same manner on any rotating planetary body and, as such, may be also be employed in extra-terrestrial environments, such as the surface of Mars, for example. Thus, where the description refers to the Earth, this should not be taken as limiting the invention.

What is claimed:

1. A gyrocompass device for determining a heading relative to a surface of a rotating planetary body, the gyrocompass device comprising:
   one or more MEMS gyroscopes that are each fixed in an orientation on a substrate that is parallel to a first plane and that are each configured to provide at least three sense axes that lie within the first plane and are each offset from one another by an offset angle; and
   a heading determiner configured to receive rotation rates from the at least three sense axes of the one or more MEMS gyroscopes and to determine the heading of the gyrocompass device relative to the surface of the rotating planetary body by fitting a sine or cosine function to the received rotation rates from the one or more MEMS gyroscopes.

2. The gyrocompass device of claim 1, wherein the respective offset angles of the at least three sense axes are angled at regular intervals of 360/N, where N is a number of the at least three sense axes.

3. The gyrocompass device of claim 1, wherein heading determiner is further configured to retrieve values for a bias error of each of the at least three sense axes of the one or more MEMS gyroscopes in a lookup table and to subtract the bias error from the received rotation rates before determining the heading of the gyrocompass device.

4. The gyrocompass device of claim 1,
   wherein the sine function is of the form C sin($\alpha_n+\beta$) or C cos($\alpha_n+\beta$), where C is an amplitude of the sine function that which depends at least on a latitude of the gyrocompass device, $\alpha_n$ is the offset angle of the nth sense axis and $\beta$ is a phase offset that a fixed difference with respect to true north, and
   wherein the heading determiner is configured to determine the gyrocompass device by varying the phase offset $\beta$ to determine a value with a minimum error in a fit of the sine function to the received rotation rates.

5. The gyrocompass device of claim 1, wherein the heading determiner is configured to determine the heading of the gyrocompass device when a range of values of the received rotation rates is below a threshold.

6. The gyrocompass device of claim 1, further comprising:
   a GNSS receiver or a connection configured to communicate with a GNSS receiver and an inertial measurement unit,
   wherein the heading determiner is configured to:
      calculate a heading based on the output of the GNSS receiver and the inertial measurement unit,
      average received rotation rates of each of the at least three sense axes over time;
      calculate a component of rotation of the rotating planetary body that is sensed by each of the at least three sense axes of the one or more MEMS gyroscopes based on the heading calculated based on the output of the GNSS receiver and inertial measurement unit; and
      determine a bias error of each of the at least three sense axes of the one or more MEMS gyroscopes by subtracting the calculated component of the rotation for each of the at least three sense axes from the averaged received rotation rate of the respective sense axis.

7. The gyrocompass device of claim 1, further comprising at least one of:
   a yaw gyroscope configured to measure a rotation of the one or more MEMS gyroscopes about an axis perpendicular to a measurement axes of the one or more MEMS gyroscopes; and
   an inertial measurement unit;
   wherein the heading determiner is further configured to measure a movement of the one or more MEMS gyroscopes relative to the surface of the rotating planetary body while the rotation rates are being measured by the one or more MEMS gyroscopes and to stabilize the received rotation rates by subtracting calculated rates caused by the measured movement of the one or more MEMS gyroscopes relative to the surface of the rotating planetary body from the received rotation rates before determining the heading of the gyrocompass device.

8. The gyrocompass device of claim 1, wherein the heading determiner is further configured to determine the heading of the gyrocompass device by:
   receiving first rotation rates from the one or more MEMS gyroscopes at a first position;
   measuring the rotation of the one or more MEMS gyroscopes from the first position to a second position;
   receiving second rotation rates from the one or more MEMS gyroscopes at the second position;
   calculating a differential rotation rate for each of the at least three sense axes of the one or more MEMS gyroscopes by subtracting the second received rotation rate from the first received rotation rate;
   fitting the differential rotation rates to a sine or cosine function to determine a phase offset of the sine or cosine function, wherein the phase offset corresponds to the heading of the gyrocompass device.

9. The gyrocompass device of claim 1, further comprising:
   an inclinometer or inertial measurement unit configured to determine the orientation of the one or more MEMS gyroscopes relative to a direction of a gravitational field,
   wherein the heading determine is further configured to use an inclination measured by the inclinometer to correct at least one of heading and latitude calculations.

10. The gyrocompass device of claim 1, further comprising:
    two MEMS gyroscopes that includes the one or more MEMS gyroscopes,
    wherein the two MEMS gyroscopes each include at least two sense axes that lie in the first plane perpendicular to one another, and wherein the two MEMS gyroscopes are rotated by 180 degrees with respect to one another such that the at least three sense axes of the one or more MEMS gyroscopes MEMS gyroscopes are arranged at 90-degree intervals.

11. A method for determining a heading relative to surface of a rotating planetary body by a gyrocompass device, the method comprising:
receiving rotation rates from one or more MEMS gyroscopes that are fixed in an orientation on a substrate that is parallel to a first plane and that provide at least three sense axes that lie within the first plane and are each offset from one another by an offset angle
determining the heading of the gyrocompass device relative to the surface of the rotating planetary body by fitting a sine or cosine function to the received rotation rates from the one or more MEMS gyroscopes.

12. The method of claim 11, wherein the respective offset angles of the at least three sense axes are angled at regular intervals of 360/N, where N is a number of the at least three sense axes.

13. The method of claim 11, further comprising:
retrieving values for a bias error of each of the at least three sense axes of the one or more MEMS gyroscopes in a lookup table: and
subtracting the bias error from the received rotation rates before determining the heading of the gyrocompass device.

14. The method of claim 11,
wherein the sine function is of the form $C \sin(\alpha_n+\beta)$ or $C \cos(\alpha_n+\beta)$, where C is an amplitude of the sine function that which depends at least on a latitude of the gyrocompass device, $\alpha_n$ is the offset angle of the nth sense axis and $\beta$ is a phase offset that a fixed difference with respect to true north, and
wherein the method further comprises determining the heading of the gyrocompass device by varying the phase offset $\beta$ to determine a value with a minimum error in a fit of the sine function to the received rotation rates.

15. The method of claim 11, further comprising determining the heading of the gyrocompass device when a range of values of the received rotation rates is below a threshold.

16. The method of claim 11, further comprising:
calculating a heading based on an output of at least one of a GNSS receiver and an inertial measurement unit;
averaging received rotation rates of each of the at least three sense axes over time;
calculating a component of rotation of the rotating planetary body that is sensed by each of the at least three sense axes of the one or more MEMS gyroscopes based on the heading calculated based on the output of the at least one of the GNSS receiver and inertial measurement unit; and
determining a bias error of each of the at least three sense axes of the one or more MEMS gyroscopes by subtracting the calculated component of the rotation for each of the at least three sense axes from the averaged received rotation rate of the respective sense axis.

17. The method of claim 11, further comprising at least one of:
a yaw gyroscope configured to measure a rotation of the one or more MEMS gyroscopes about an axis perpendicular to a measurement axes of the one or more MEMS gyroscopes; and
an inertial measurement unit;
measuring a movement of the one or more MEMS gyroscopes relative to the surface of the rotating planetary body while the rotation rates are being measured by the one or more MEMS gyroscopes; and
stabilizing the received rotation rates by subtracting calculated rates caused by the measured movement of the one or more MEMS gyroscopes relative to the surface of the rotating planetary body from the received rotation rates before determining the heading of the gyrocompass device.

18. The method of claim 11, wherein determining of the heading of the gyrocompass device further comprises:
receiving first rotation rates from the one or more MEMS gyroscopes at a first position;
measuring the rotation of the one or more MEMS gyroscopes from the first position to a second position;
receiving second rotation rates from the one or more MEMS gyroscopes at the second position;
calculating a differential rotation rate for each of the at least three sense axes of the one or more MEMS gyroscopes by subtracting the second received rotation rate from the first received rotation rate;
fitting the differential rotation rates to a sine or cosine function to determine a phase offset of the sine or cosine function, wherein the phase offset corresponds to the heading of the gyrocompass device.

19. The method of claim 11, further comprising:
determining the orientation of the one or more MEMS gyroscopes relative to a direction of a gravitational field; and
using an inclination based on the determined orientation to correct at least one of heading and latitude calculations.

20. The method of claim 11, wherein:
the one or more MEMS gyroscopes includes two MEMS gyroscopes that each include at least two sense axes that lie in the first plane perpendicular to one another, and
the method further comprises rotating the two MEMS gyroscopes by 180 degrees with respect to one another such that the at least three sense axes of the one or more MEMS gyroscopes MEMS gyroscopes are arranged at 90-degree intervals.

* * * * *